United States Patent Office 3,627,479
Patented Dec. 14, 1971

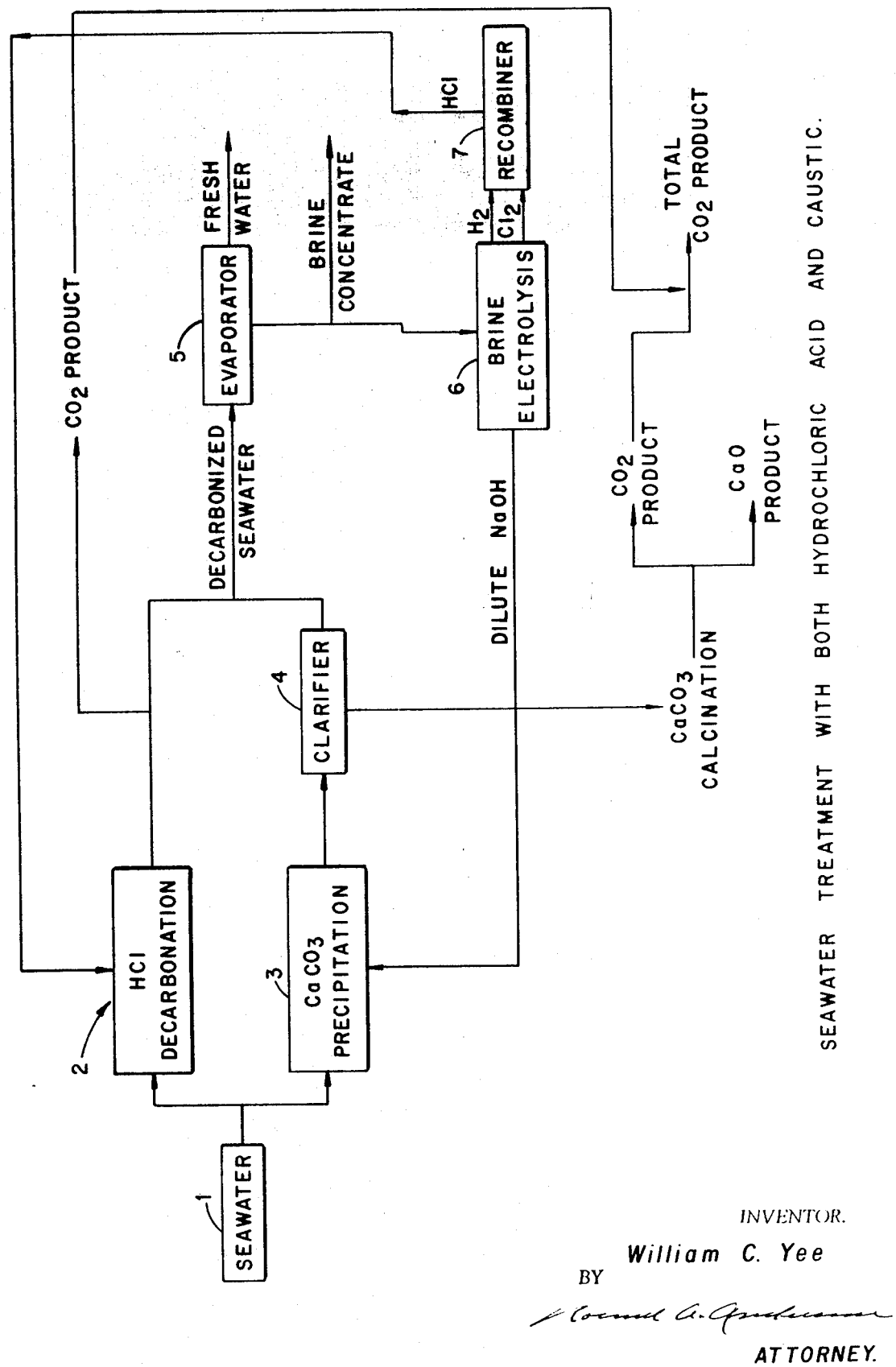

3,627,479
CHEMICAL-ELECTRO-CHEMICAL CYCLE FOR DESALINATION OF WATER
William C. Yee, Oak Ridge, Tenn., assignor to the United States of America as represented by the United States Atomic Energy Commission
Filed Oct. 10, 1968, Ser. No. 766,438
Int. Cl. C01f 11/18; C23f 15/00; B01d 1/00
U.S. Cl. 23—66                                 3 Claims

ABSTRACT OF THE DISCLOSURE

This invention is a method of removing scale-forming materials from sea water by adding an alkali to a first feed stream of sea water, removing precipitated metal carbonates from the resulting alkaline stream, adding an acid to a second feed stream of sea water, removing $CO_2$ from the resulting acidulated stream, combining said first and second streams and introducing the combined streams into an evaporator.

BACKGROUND OF THE INVENTION

Efficient evaporation processes for recovering salt-free water from sea water must include a method for removing alkaline scale-forming materials from the sea water. Alkaline scale is formed when bicarbonate ion is broken down thermally into carbonate and hydroxide ions which react with calcium and magnesium present to form insoluble $CaCO_3$ and $Mg(OH)_2$. Scale control methods depend upon removing the bicarbonate ion, the calcium and magnesium ions, or all three ions from the sea water feed to the evaporator. Bicarbonate may be removed by adding an acid, for example, sulfuric acid, to the sea water, thus converting bicarbonate into water and carbon dioxide in accordance with the reaction:

$$HCO_3^- + H^+ \rightleftharpoons H_2O + CO_2(g)$$

The $CO_2$ produced can be removed in a degasifying system.

Calcium can be removed together with bicarbonate by adding an alkali such as NaOH to the sea water. The addition of NaOH forms carbonate from the bicarbonate in accordance with the reaction:

$$HCO_3^- + OH^- \rightarrow CO_3^= + H_2O$$

The $CO_3^=$ produced precipitates calcium as the carbonate.

The descaling methods require the addition of an alkali or an acid to the feed stream, the cost of which seriously affects the stringent economics associated with desalination processes. The cost of chemicals can be minimized by producing them at the evaporator site, and proposals have been made to incorporate a sulfuric acid plant into a desalination complex. However, less expensive methods are desirable.

SUMMARY OF THE INVENTION

It is accordingly one object of my invention to provide an improved method of removing scale-forming materials from sea water.

It is another object to provide such a method which minimizes the cost of removing scale.

It is another object to provide a method of removing scale-forming materials which can readily be integrated into an evaporation process.

Other objects of my invention will become apparent from the following description and the attached claims.

In accordance with my invention I have provided a process for treating sea water containing calcium and bicarbonate values comprising: (a) electrolyzing a concentrated brine derived from sea water to form NaOH, $H_2$, and $Cl_2$; (b) combining at least a portion of said $H_2$ and $Cl_2$ to form HCl; (c) adding said HCl to a first portion of sea water in a sufficient quantity to react with bicarbonate present in said sea water to produce $CO_2$; (d) removing said $CO_2$ from the resulting acidulated sea water; (e) adding NaOH formed in step (a) to a second portion of sea water in a sufficient quantity to precipitate calcium values as calcium carbonates; (f) removing the precipitated calcium carbonate from the resulting alkaline sea water; (g) combining the acidulated sea water produced in step (d) with the alkaline sea water produced in step (f); (h) evaporating a portion of the mixture formed in step (g) to produce fresh water and a concentrated brine; and (i) recycling a portion of said concentrated brine to an electrolysis cell to carry out step (a).

My method not only uses chemicals which can readily be produced at the site of the desalination complex, but also ensures that there need be no unusable by-product. One mole of hydroxide has the same capacity of removing alkaline scale as one mole of acid. In view of this equivalency and the fact that equal molar quantities of NaOH and HCl can be produced it is possible to adjust operating conditions to ensure that all the chemicals produced are either used internally or sold regardless of the outside fluctuations in demand for hydroxide or acid.

The following table summarizes the operating and total costs for a caustic-chlorine plant for NaOH and HCl treatment of two billion gallons per day of sea water and corresponding costs for an equivalent sulfuric acid plant.

OPERATING AND INVESTMENT COST FOR CAUSTIC-CHLORINE AND SULFURIC ACID PLANTS

| | Costs/million/year | |
|---|---|---|
| | Sulfuric acid (980 tons/day) | Caustic-chlorine (355 tons/day $Cl_2$) |
| Raw material | 5.352 | 0.426 |
| Labor | 0.135 | 0.233 |
| Maintenance supplies | 0.068 | 0.807 |
| Electric power | 0.006 | 0.746 |
| Steam power | | 0.007 |
| Cooling water | 0.051 | 0.035 |
| Plant overhead | 0.081 | 0.138 |
| Operating cost | 5.693 | 2.392 |
| Investment | 0.293 | 1.268 |
| Total annual cost | 5.986 | 3.660 |

As can be seen from the above figures sea water can be treated more cheaply by my method than by the use of sulfuric acid, normally the chemical of choice because of its lower cost.

BRIEF DESCRIPTION OF THE DRAWING

The drawing is a flow sheet showing my process.

The incoming stream of sea water at 1 is split into two streams, one of which is treated with HCl and decarbonated in zone 2. The other stream is treated with NaOH at precipitation zone 3, and the resulting precipitated $CaCO_3$ is removed in clarifier 4. The two treated streams are then combined and introduced into evaporator 5. A portion of the brine is electrolyzed at 6. The NaOH produced is mixed with sea water at precipitation zone 3; the $H_2$ and $Cl_2$ are combined in recombiner 7 and the resulting HCl mixed with sea water in decarbonation zone 2.

DESCRIPTION OF THE PREFERRED EMBODIMENT

In my method a feed stream of sea water is divided into two portions which are then treated separately to remove alkaline scale-forming materials. One of these streams is treated with acid and the other with sodium hydroxide. Both chemicals are produced within the desalination system as described in more detail below.

The relative flow rates of the two streams may be varied depending on the relative amounts of acid and alkali which are available for use in treating the water. In operating a completely closed system where neither of these chemicals is disposed of elsewhere a 1:1 ratio will permit complete usage of the chemicals and the capital cost for the caustic-chlorine plant will be at a minimum.

In each stream sufficient acid or alkali must be added to react with the bicarbonate present. As is indicated above, the amount is one mole of either acid or alkali per mole of bicarbonate, which is about 2.3 millimoles per liter in sea water.

The stream which has been acidulated is treated to remove the $CO_2$ which is formed. Conventional deaeration or degasification steps may be used and the decarbonated water is then sent to an evaporator.

The stream treated with sodium hydroxide is treated to remove the precipitated calcium carbonate and the clarified sea water is introduced into the evaporator with the acidulated sea water.

A portion of the concentrated brine from the evaporator is introduced into an electrolysis cell wherein dilute NaOH, $Cl_2$, and $H_2$ are produced. At least a portion of the NaOH is used to treat additional sea water and the $H_2$ and $Cl_2$ are combined to form HCl to add to the sea water.

Having thus described my invention the following example is given to illustrate it in more detail.

EXAMPLE

An evaporation desalination system to produce 1000 million gallons per day (M.G.D.) of fresh water by treating 2000 M.G.D. of sea water operates in accordance with the figure. In the system shown all the caustic-chlorine production is used for sea water treatment. Included in the system is an electrolysis plant capable of producing 355 tons per day of $Cl_2$, 400 tons per day of NaOH and 10 tons per day of hydrogen. The hydrogen and chlorine are combined to produce 365 tons per day of HCl. The HCl produced is added to one-half the sea water feed, i.e., 1000 M.G.D. to produce 414 tons per day of $CO_2$.

The sodium hydroxide is added to the remainder of the sea water feed stream precipitating $CaCO_3$. The $CaCO_3$ is removed and calcined at a rate of 978 tons per day. The $CaCO_3$ is calcined to produce 430 tons per day $CO_2$ and 548 tons per day of CaO.

The foregoing example is intended to illustrate, not to limit, my invention. It is obvious that changes may be made in the ratio of volume of the acid treated stream to the volume of the alkaline treated stream.

Having thus described my invention, I claim:
1. A process for treating sea water containing calcium and bicarbonate values comprising:
   (a) electrolyzing a concentrated brine derived from sea water to form NaOH, $H_2$, and $Cl_2$;
   (b) combining at least a portion of said $H_2$ and $Cl_2$ to form HCl;
   (c) adding said HCl to a first portion of sea water in a sufficient quantity to react with bicarbonate present in said sea water to produce $CO_2$;
   (d) removing said $CO_2$ from the resulting acidulated sea water;
   (e) adding NaOH formed in step (a) to a second portion of sea water in a sufficient quantity to precipitate calcium values as calcium carbonate;
   (f) removing the precipitated calcium carbonate from the resulting alkaline sea water;
   (g) combining the acidulated sea water produced in step (d) with the alkaline sea water produced in step (f);
   (h) evaporating a portion of the mixture formed in step (g) to produce fresh water and a concentrated brine; and
   (i) recycling a portion of said concentrated brine to an electrolysis cell to carry out step (a).

2. The method of claim 1 wherein all the $Cl_2$, $H_2$, and NaOH produced in step (a) are utilized in treating sea water.

3. The method of claim 1 wherein the volumes of the acidulated sea water and the alkaline sea water are essentially equal.

References Cited
UNITED STATES PATENTS

| | | |
|---|---|---|
| 2,947,690 | 8/1960 | Axelrad _____ 210—57 |
| 3,350,292 | 10/1967 | Weinberger et al. ____ 203—7 X |
| 3,463,814 | 8/1969 | Blanco et al. _____ 203—7 X |

MILTON WEISSMAN, Primary Examiner

U.S. Cl. X.R.

210—57; 203—7